United States Patent
Rucco et al.

(10) Patent No.: US 11,566,803 B2
(45) Date of Patent: Jan. 31, 2023

(54) SATISFACTION MEASUREMENT FOR SMART BUILDINGS

(71) Applicant: Carrier Corporation, Palm Beach Gardens, FL (US)

(72) Inventors: Matteo Rucco, Trento (IT); Fabrizio Smith, Rome (IT); Alberto Ferrari, Rome (IT); Jason Higley, Pittsford, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 148 days.

(21) Appl. No.: 17/046,562

(22) PCT Filed: Apr. 5, 2019

(86) PCT No.: PCT/US2019/025953
§ 371 (c)(1),
(2) Date: Oct. 9, 2020

(87) PCT Pub. No.: WO2019/199594
PCT Pub. Date: Oct. 17, 2019

(65) Prior Publication Data
US 2021/0131687 A1 May 6, 2021

Related U.S. Application Data

(60) Provisional application No. 62/654,659, filed on Apr. 9, 2018.

(51) Int. Cl.
*F24F 11/30* (2018.01)
*F24F 11/58* (2018.01)
(Continued)

(52) U.S. Cl.
CPC .............. *F24F 11/30* (2018.01); *F24F 11/57* (2018.01); *F24F 11/58* (2018.01); *G05B 15/02* (2013.01);
(Continued)

(58) Field of Classification Search
CPC .. F24F 11/30; F24F 11/57; F24F 11/58; F24F 2110/10; F24F 2120/10; F24F 2120/14;
(Continued)

(56) References Cited

U.S. PATENT DOCUMENTS

| | | | |
|---|---|---|---|
| 7,664,573 | B2 | 2/2010 | Ahmed |
| 7,734,572 | B2 | 6/2010 | Wiemeyer et al. |

(Continued)

FOREIGN PATENT DOCUMENTS

| | | |
|---|---|---|
| CN | 102486644 A | 6/2012 |
| IN | 201502263 P2 | 2/2016 |

(Continued)

OTHER PUBLICATIONS

Chen, H. et al.; "The Design and Implementation of a Smart Building Control System"; IEEE Conference Publication; Oct. 21-23, 2009; Macau, China; 3 Pages. Abstract Only.

(Continued)

*Primary Examiner* — Ramesh B Patel
(74) *Attorney, Agent, or Firm* — Cantor Colburn LLP

(57) ABSTRACT

A method and system for measuring satisfaction for a smart building is disclosed. A method includes detecting a presence of a user at the smart building; monitoring actions of the user in the smart building with respect to each of a plurality of aspects; receiving feedback via a human machine interface from the user regarding one or more of the plurality of aspects; and building the profile for the user based on the actions and feedback; wherein: monitoring actions comprises using one or more sensors to detect (Continued)

movement of the user through the smart building; receiving feedback includes determining a satisfaction level of the user with respect to thermal comfort; and adjusting the one or more of the plurality of aspects based on the profile.

14 Claims, 9 Drawing Sheets

(51) Int. Cl.
| | |
|---|---|
| *F24F 11/57* | (2018.01) |
| *G05B 15/02* | (2006.01) |
| *H04W 4/33* | (2018.01) |
| *H04W 4/021* | (2018.01) |
| *H04W 4/029* | (2018.01) |
| *H04L 29/08* | (2006.01) |
| *H04L 67/306* | (2022.01) |
| *F24F 120/10* | (2018.01) |
| *F24F 120/20* | (2018.01) |
| *F24F 120/14* | (2018.01) |
| *F24F 110/10* | (2018.01) |

(52) U.S. Cl.
CPC ........... *H04L 67/306* (2013.01); *H04W 4/021* (2013.01); *H04W 4/029* (2018.02); *H04W 4/33* (2018.02); *F24F 2110/10* (2018.01); *F24F 2120/10* (2018.01); *F24F 2120/14* (2018.01); *F24F 2120/20* (2018.01)

(58) Field of Classification Search
CPC .... F24F 2120/20; G05B 15/02; H04L 67/306; H04L 67/12; H04W 4/021; H04W 4/029; H04W 4/33; G06Q 10/06
See application file for complete search history.

(56) References Cited

U.S. PATENT DOCUMENTS

| | | | |
|---|---|---|---|
| 7,904,209 B2 | 3/2011 | Podgorny et al. | |
| 9,104,183 B2 | 8/2015 | Zheng et al. | |
| 9,147,296 B2 | 9/2015 | Ricci | |
| 9,213,325 B2 | 12/2015 | Ploix et al. | |
| 9,244,444 B2 | 1/2016 | Carty et al. | |
| 9,423,779 B2 | 8/2016 | Agarwal | |
| 9,520,250 B2 | 12/2016 | Okeeffe | |
| 9,564,123 B1 | 2/2017 | Mont-Reynaud et al. | |
| 9,587,848 B2 | 3/2017 | Adamik et al. | |
| 2007/0168241 A1 | 7/2007 | Robbins | |
| 2009/0187626 A1 | 7/2009 | Degaugue | |
| 2013/0048263 A1 | 2/2013 | Nouvel et al. | |
| 2013/0234840 A1 | 9/2013 | Trundle et al. | |
| 2014/0142729 A1* | 5/2014 | Lobb | G06V 40/20 700/90 |
| 2014/0266669 A1* | 9/2014 | Fadell | G08B 19/00 340/501 |
| 2014/0277765 A1 | 9/2014 | Karimi et al. | |
| 2015/0100167 A1* | 4/2015 | Sloo | F24F 11/33 700/278 |
| 2015/0148967 A1* | 5/2015 | Logan | G05B 15/02 700/276 |
| 2015/0316945 A1 | 11/2015 | Soya | |
| 2016/0026729 A1 | 1/2016 | Gil et al. | |
| 2016/0028605 A1 | 1/2016 | Gil et al. | |
| 2016/0116343 A1 | 4/2016 | Dixon et al. | |
| 2016/0217631 A1 | 7/2016 | Petricoin, Jr. | |
| 2016/0370773 A1* | 12/2016 | Mousavi | G05B 15/02 |
| 2017/0038787 A1* | 2/2017 | Baker | H04W 4/021 |
| 2017/0053068 A1* | 2/2017 | Pillai | G05B 19/048 |
| 2017/0055126 A1 | 2/2017 | O'Keeffe | |
| 2017/0068782 A1* | 3/2017 | Pillai | G06Q 50/16 |
| 2017/0122617 A1* | 5/2017 | Sinha | G06Q 20/383 |
| 2017/0124838 A1 | 5/2017 | Sinha et al. | |
| 2017/0142628 A1 | 5/2017 | Seddiq et al. | |
| 2017/0207926 A1 | 7/2017 | Gil et al. | |
| 2017/0234562 A1* | 8/2017 | Ribbich | G05D 23/1934 700/277 |
| 2017/0261951 A1 | 9/2017 | Bandara et al. | |
| 2018/0110960 A1* | 4/2018 | Youngblood | A47C 31/008 |
| 2018/0359112 A1* | 12/2018 | Lee | A61M 21/02 |
| 2019/0035242 A1* | 1/2019 | Vazirani | G08B 15/00 |
| 2020/0077942 A1* | 3/2020 | Youngblood | A61B 5/4812 |
| 2020/0113344 A1* | 4/2020 | Youngblood | A61B 5/4815 |
| 2021/0055011 A1* | 2/2021 | Smith | F24F 11/64 |

FOREIGN PATENT DOCUMENTS

| | | |
|---|---|---|
| KR | 20100115967 A | 10/2010 |
| WO | 2016135477 A1 | 9/2016 |
| WO | 2016135514 A1 | 9/2016 |
| WO | 2017120259 A1 | 7/2017 |

OTHER PUBLICATIONS

Gokcell, S. et al.; "IoT in Action: Design and Implementation of a Building Evacuation Service"; vol. 2017; Jan. 22, 2017; 25 Pages.
International Search Report and Written Opinion for Application No. PCT/US2019/023552; dated Jun. 26, 2019; 13 Pages.
International Search Report and Written Opinion for Application No. PCT/US2019025953; dated Jul. 2, 2019; 11 Pages
Jazizadeh, Farrokh et al., "A Thermal Preference Scale for Personalized Comfort Profile Identification via Participatory Sensing", Building and Environment; vol. 68, Oct. 2013, 3 Pages. Highlights Only.
Khalili, A. et al.; "Hierarchical Preference Learning for Light Control from User Feedback"; IEEE; Jul. 2010; 7 Pages.
Ogunjuyigbe et al., "User Satisfaction-Induced Demand Side Load Management in Residential Buildings with User Budget Constraints", Applied Energy, vol. 187, Science Direct, Elsevier, Feb. 1, 2017, 3 Pages, Abstract Only.
Ornetzeder et al., "User Satisfaction and Well-Being in Energy Efficient Office Buildings: Evidence from Cutting-Edge Projects in Australia", Energy and Buildings, vol. 118, Science Direct, Elsevier, Apr. 15, 2016, 3 Pages, Abstract Only.
Pargfrieder, J. et al.; "An integrated control system for optimizing the energy consumption and user comfort in buildings"; IEEE Conference Publication; Sep. 20, 2020; Glasglow, UK; 2 Pages, Abstract Only.
Park, Sangmin et al., Design of Building Energy Autonomous Control System with the Intelligent Object Energy Chain Mechanism Based on Energy-IoT; International Journal of Distributed Senser Networks, Nov. 1, 2016, 16 pages.
Tang et al., "Evaluation of User Satisfaction Using Evidential Reasoning-Based Methodology", Neurocomputing, vol. 142, Science Direct, Elsevier, Oct. 22, 2014, 4 Pages, Abstract Only.
Unknown Author; Tenant Satisfaction; Building Engines; 4 Pages.
Teso et al., "Structured Learning Modulo Theories", Artificial Intelligence, vol. 244, Science Direct, Elsevier, Mar. 2017, 2 Pages, Abstract Only.
Unknown Author; Design Specifications—MyriaMesh Wireless Building Lighting Control; https://chess-wise.eu/en/2017/01/31/start-myriamesh-wireless-building-lighting-control-end-smart-sustainable-building-2/.
Design Specifications—MyriaMesh Wireless Building Lighting Control; https://chess-wise.eu/en/2017/01/31/start-myriamesh-wireless-building-lighting-control-end-smart-sustainable-building-2/.
Gokceli, S. et al.; "oT in Action: Design and Implementation of a Building Evacuation Service"; vol. 2017; Jan. 22, 2017; 25 Pages.
Tenant Satisfaction; Building Engines; 4 Pages.

\* cited by examiner

SATISFACTION MEASUREMENT FOR SMART BUILDINGS

CROSS-REFERENCE TO RELATED APPLICATIONS

This application is a 371 U.S. National Stage application of PCT/US2019/025953, filed Apr. 5, 2019, which claims the benefit of U.S. Provisional Application No. 62/654,659, filed Apr. 9, 2018, both of which are incorporated by reference in their entirety herein.

Reference is made to U.S. patent application Ser. No. 17/040,363, filed on Sep. 22, 2020, pending.

BACKGROUND

Exemplary embodiments pertain to the art of electronics. In particular, the present disclosure relates to a method and system for measuring satisfaction in smart buildings.

Today's technology has enabled the integration of new technologies into buildings that provide a variety of benefits. For example, power consumption can be reduced through the use of smart technology, as discussed in greater detail in U.S. patent application Ser. No. 62/644,836, titled "Predicting the Impact of Flexible Energy Demand on Thermal Comfort." Smart building technology can provide for the optimization of energy usage as well as improving usability for tenants, owners, employees, and other users of a building. One method of providing energy savings and usability improvements is through the use of user profiles.

BRIEF DESCRIPTION

According to one embodiment, a method and system for measuring satisfaction for a smart building is disclosed. A method includes detecting a presence of a user at the smart building; monitoring actions of the user in the smart building with respect to each of a plurality of aspects; receiving feedback via a human machine interface from the user regarding one or more of the plurality of aspects; and building the profile for the user based on the actions and feedback; wherein: monitoring actions comprises using one or more sensors to detect movement of the user through the smart building; receiving feedback includes determining a satisfaction level of the user with respect to comfort; and adjusting the one or more of the plurality of aspects based on the profile.

In addition to one or more features described above, or as an alternative, further embodiments may include wherein the human machine interface is an app executed on a mobile electronic device.

In addition to features described above, or as an alternative, further embodiments may include wherein the plurality of aspects includes thermal comfort, lighting comfort, services interaction, and health status.

In addition to features described above, or as an alternative, further embodiments may include wherein lighting comfort includes quantity of light and color temperature of light.

In addition to features described above, or as an alternative, further embodiments may include wherein the plurality of aspects includes services interactions.

In addition to features described above, or as an alternative, further embodiments may include observing deviation between the user's comfort and response of the smart building.

In addition to features described above, or as an alternative, further embodiments may include assigning weights to each of the plurality of aspects.

In addition to features described above, or as an alternative, further embodiments may include determining which aspect of the plurality of aspects is causing a discomforting condition based on the weights.

In addition to features described above, or as an alternative, further embodiments may include adjusting parameters of the smart building based on the aspect causing the discomforting condition.

In addition to features described above, or as an alternative, further embodiments may include wherein detecting the presence of the user comprises sensing a mobile electronic device carried by the user.

In addition to features described above, or as an alternative, further embodiments may include wherein detecting the presence of the user comprises sensing usage of an access control device by the user.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
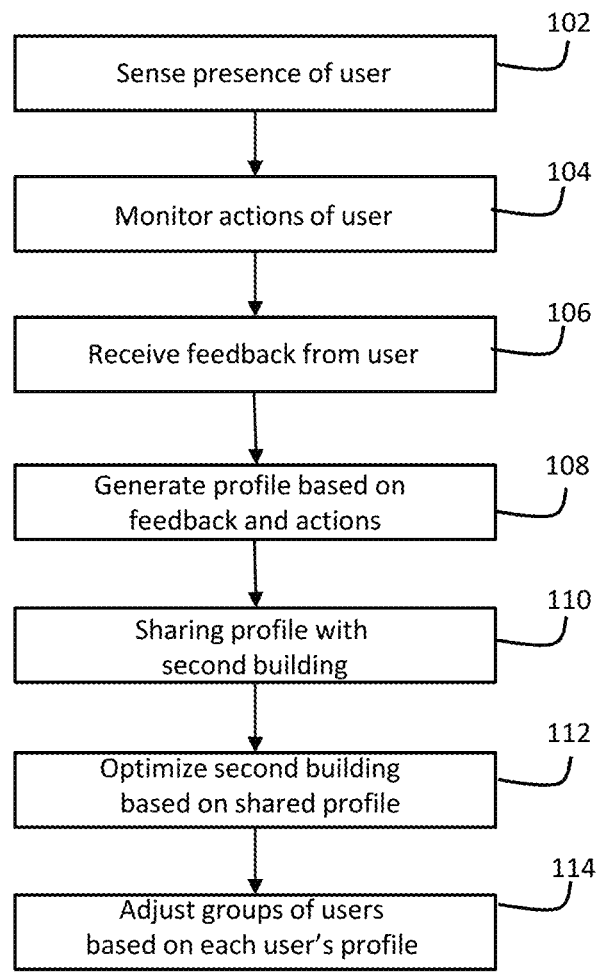
FIG. 1 is a flowchart illustrating the operation of one or more embodiments.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Thermal comfort in an indoor location is achieved through the use of heating, ventilation, and air conditioning (HVAC) units placed throughout the indoor location. HVAC can be very expensive, representing up to 65 percent of energy consumption of a building.

In the past, there have been many different ways of controlling the thermal comfort and thus the energy consumed to achieve a thermal comfort level. A very approximate way of doing so is to manually control air conditioning and heating units—turning them on and off as needed, depending on if a building's occupants are comfortable. Later, thermometers were added—if too high a temperature was sensed, an air conditioning system could be switched on to cool the room. If too low a temperature was sensed, a heating system could be switched on to heat the room. As technology became more sophisticated, additional methods were added.

Advancements in technology have enabled machine-learning methods and systems to be used to monitor and learn thermal comfort levels of occupants. Using voting techniques, one or more embodiments can determine a comfort level of each occupant of a group of occupants. Thereafter, a thermal profile can be updated based on the received feedback.

In addition to the thermal profile, there can be additional parameters stored in a full profile. In one or more embodiments, machine-learning methods and systems can be used to monitor and learn a variety of categories of information (also known as "aspects"). A full profile includes a variety of information mined from historical data that can be used to increase building efficiency and/or add to a user's convenience or experience. In one or more embodiments, five or more aspects can be mined to obtain insights about a user in a variety of different categories. The aspects are stored as a tuple in a knowledge base.

In general, a tuple can be formed by the type of input data, the data preprocessing chain, and which computational model is used for processing the input data. The tuple can be accessed by a smart building to customize each user's experience in the smart building, based on the mined data. The data is pre-processed and a machine-learning algorithm is used on the data to perform predictions on the data or to perform clustering on the data (to determine similarities between users). A global score can be defined for each aspect and for each user. Thereafter, the global scores can be compared and clustered among multiple users based on similarities.

The aspects will now be described. Thermal comfort is described in greater detail in U.S. Patent application Ser. No. 62/644,813, titled "Machine-Learning Method for Conditioning Individual or Shared Areas," the contents of which are incorporated herein by reference.

To explain thermal profile briefly, in a smart building, heating, ventilation, and air conditioning (HVAC) systems can be controlled using a concept called thermal comfort. Thermal comfort uses a variety of measurements of a room to estimate the thermal comfort level of the room. The measurements can include temperature, humidity, air velocity, and the like. A field can be generated that estimates a thermal comfort level of the room being conditioned. Using one of a variety of different methods, a user can indicate whether or not the user is comfortable in the present thermal condition. If the user is too cold or too hot, the user's deviation from the estimation can be stored in a thermal profile. The thermal profile would indicate, for example, that a particular user generally likes his rooms to be warmer than most people or cooler than most people. This thermal profile could allow a smart building to sense or predict that a user has entered a particular room and adjust the room's thermal comfort level when the user enters the room. This can even be done in advance if, for example, the user's calendar or reservation indicates that the user will be in a particular location at a particular time.

The use of such a thermal profile also has advantages in building efficiency. If a user does not like cold rooms, unnecessary use of air conditioning systems can be avoided. If a room is unused, the room does not need to be heated or conditioned, with the knowledge that the room will be at a comfortable thermal level by the time the room is occupied.

Another aspect that can be monitored and stored in a user profile is visual (or lighting) comfort. Visual comfort can include a variety of different aspects of a room related to a user's vision. This can include lighting, shades, blinds, and the like.

With respect to lighting comfort, each user might have different levels of comfort depending on the quantity and quality of lighting. Quantity of lighting can include amount of lighting, measured, for example, in lumens through the use of a light meter. Some users may, in general, prefer a brighter environment than other users. Some users may have poor night vision and thus prefer to have brighter lighting than other users. Other users may be sensitive to bright lighting and prefer a less bright area. Quantity of lighting also can include lighting from windows. Shades, blinds, and other window coverings can be controlled by the smart building (for example, through the use of motorized window coverings) to provide the desired quantity of lighting. Sensors can measure the amount of natural light in a room and adjust the light level in the room based on the natural light. Quality of lighting can include various aspects of the type of lighting. Aspects such color temperature of lighting also can be monitored and adjusted. For example, it could be found that a certain user prefers a natural color temperature (e.g., around 5000K) during the daylight hours, but a "warmer" color temperature during the night (e.g., around 2700K). Thereafter, when the user is in a room, the color temperature of the light can be adjusted to meet his preferences.

Services interaction refers to the manner in which a user interacts with the various services provided by the building. For example, one user may utilize the elevators four times per day and another may use the elevator eight times per day. One user may prefer one particular cafeteria while a different user may use a different cafeteria more often.

The services interaction data can be used in conjunction with the data regarding patterns of movement. Patterns of movement refers to the areas of the building which the user utilizes. These movements can be tracked in one or more of a variety of different manners. For example, some buildings have access cards or key cards that utilize a variety of technologies, such as RFID or magnetic stripes, that enable the holder of the card to access certain areas of a building. In addition, some buildings are now adding access technology to mobile electronic devices, such as smart phones, tablets, MP3 players, eReaders, smart watch, health tracker, and any other type of device that has computational capabilities. Those mobile electronic devices can then be used to gain access to various rooms. Other access granting devices can use biometric information, such as fingerprint readers, facial recognition, retinal scans, and other biometric devices that rely on a characteristic of a person to grant access to a room or area of a building. Information regarding access to rooms or areas can be stored as patterns of movement.

In addition, a variety of sensors placed throughout a smart building can allow the tracking of users as the user moves through a building. Sensors can be of any type. For example, facial recognition algorithms can be used in conjunction with cameras to determine when a user enters certain areas of a smart building. A user's mobile electronic device can be used to in conjunction with wireless transmitters (such as Bluetooth, WiFi, near-field communication (NFC), ANT, and other wireless protocols. A signal can be sent by the wireless transmitter. When a mobile electronic device receives the signal, the mobile electronic device can transmit a response signal. The response signal can be associated with a particular mobile electronic device. Each mobile electronic device can then be associated with a user. In such a manner, the user's movements can be tracked to determine what areas of the building the user frequents.

Another aspect is health status. Health status can include any type of health information commonly tracked using a mobile electronic device. For example, heart rate and body temperature can be tracked to determine if a user is ill. If the user is ill, adjustments can be made to the room in which the user is located, to improve the user's comfort.

The aspects can be combined with context information. Context information can be broadly categorized as either person independent context information and/or person dependent context information.

Person independent context information includes information that is the same for every user within a building. Examples of person independent context information includes information about the building (e.g., layout of the building, materials of the building, dimensions, orientation of the building, and the like) and weather information (e.g., temperature, cloudiness, sunrise/sunset times, and the like).

Person dependent context is information specific to a particular user. For example, the scope of the user's visit can be part of the context information. While the above-described usage contemplates a single user, with thermal and lighting comfort prioritized for the single user, there are often times when there are multiple users in a room. In such a case, thermal and lighting comfort is set such that the greater number of users are within a certain level of comfort. When determining a comfort level for a group of users, priority can be given to certain users, such that their preferences receive a greater weight. For example, a hotel may choose to prioritize the comfort of the guests over the comfort of the employees. Therefore, a user's status as being a guest or an employee can be taken into consideration as part of the person dependent context information. For a particular user, the status as a guest or employee can change based on context. For example, a user could be an employee at one hotel, but a guest at the same hotel chain, at a different location (for example, on a vacation.) This status also can travel to different businesses. For example, a user's profile at an office building could be shared with a hotel. Therefore, when the user travels to a hotel on vacation (or business), the user's preferences regarding thermal comfort and lighting can be retrieved and used to make the user's stay at the hotel more enjoyable.

The various aspects described above can be combined and used together, along with the context information, to provide a better experience for the user and to improve a building's efficiency. For example, based on the tracked patterns of movements, the building could predict that a particular user will wake up a 6 am. The thermal condition and lighting conditions of the room can be optimized for that user. Thereafter, the area where the user eats breakfast can be prepared for the user in advance, based on the predicted location of the users. The same can be done in an office environment, with a conference room prepared for the user prior to the user even enters the conference room. In such a manner, the user's comfort conditions and the user's preferences and be discovered and anticipated. In addition, the same profile can be shared among multiple buildings and used as a digital signature of the user between buildings. For example, a hotel chain can have a user's profile. When the user enters another hotel in the chain, even if the user has never been in that particular hotel before, the user's preferences regarding thermal comfort, lighting comfort, and the like can be set for him, providing a consistent user experience for him. The sharing among buildings will be discussed in greater detail below.

In some embodiments, for privacy reasons, any of the above listed features can be switched off. While some users may appreciate the features that customize the user's experience in the smart building, other users may value their privacy. In some embodiments, the user can turn off one or more of the tracking features at any time. For embodiments in which the profile is shared among multiple smart buildings, the user can have the option of turning on the tracking in some buildings (e.g., the user's own home), but turn off tracking in public buildings (e.g., a hotel).

With respect to FIG. 1, a method 100 is presented that illustrates the operation of one or more embodiments. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined, skipped, or performed in a different order. In some embodiments, method 100 can be executed by a system 300.

Method 100 illustrates the process for creating a profile for a smart building. A user is sensed (block 102). The sensing can take place using one of a variety of different methods. For example, a variety of different sensors can detect the presence of the user at a location. The sensors can include cameras, audio sensors, card readers, wireless transducers that detect the presence of a mobile electronic device, and the like.

Thereafter, the user's actions are monitored (block 104). As described above, the monitoring can include the user's movements and the user's use of the building's facilities (e.g., rooms, elevators, restaurants, vending machines, and the like). In some embodiments, the monitoring can include integration with a user's electronic calendar. For example, a user can maintain their calendar using an electronic calendar system. One or more embodiments can link to the user's calendar (with the user's permission) to determine where the user will be, such as an appointment or meeting in a particular conference room or office within a building complex.

In addition to monitoring, there can be a set of access control rules associated with the profile. Access control rules can be configured to grant or forbid a user access to a certain set of resources. Resources can include actuators, controls, sensors, or commands. Resources can also include floors of a building or rooms within a building. Thus, the profile can indicate that some people (such as people who work maintenance) have access to areas otherwise restricted to the general public. Similarly, access control rules can indicate that a user with an apartment on the twelfth floor of a building only has access to the twelfth floor of the building (and any common areas of the building).

For an employee, access control rules can indicate that the user has the ability to change certain parameters that a typical tenant has no access to. For example, a person in security can have access to elevator controls that a general user of a building does not have.

Access control rules also can include user-dependent context information (such as the role or scope of the visit of a user), as well as user-independent context information, such as information related to the physical layout of the building.

In some embodiments, access control rules can be applied in a given environment even if there are no statements related to the environment located within the user' profile. In such a case, alternative applicable rules can be identified through the use of available contextual information. For example, a user might be set to always be able to control the lighting and HVAC parameters of a guest room, if the user's context is a guest.

The monitoring also can include user feedback (block 106). User feedback can be in the form of a human machine interface (HMI) used by the user to interact with the smart building. An exemplary human machine interface can include a mobile electronic device or a terminal located on a wall. An exemplary use of an HMI is that a user can utilize his mobile electronic device to indicate that he is too warm. The smart building will note the adjustment relative to the current thermal comfort level of the area in which the user is located. Similarly, the user can make similar notifications with respect to lighting preferences.

A profile is built using the gathered data and user feedback (block 108). The profile can include information regarding each of the aspects described above, as well as any other aspects that can be useful for a smart building.

The profile can be shared with other buildings (block 110). This can include other buildings within the same location (e.g., other buildings on an office or college campus), related buildings (e.g., buildings operated by the same entity), or subscribers to a profile service.

Thereafter, whenever the user enters a location that has his profile, the profile can be retrieved (block 112) and adjustments can be made to the user's environment based on the information in the profile.

In a group setting (i.e., the user is located in a room or area with multiple users), the profile for each user can be retrieved and analyzed as above. The adjustments can be based on a score assigned to each user, taking into account similarities between users, using machine-learning techniques (block 114).

Figure 2:
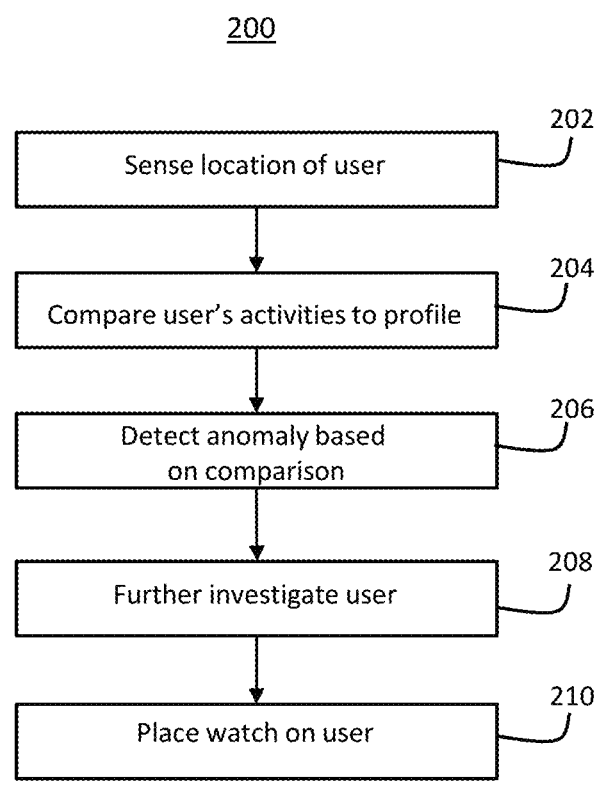
FIG. 2 is a flowchart illustrating the operation of one or more embodiments.

With respect to FIG. 2, a method 200 is presented that illustrates the operation of one or more embodiments. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined, skipped, or performed in a different order. In some embodiments, method 200 can be executed by a system 300.

In addition to the above, user's habits can be mined from historical data and then leveraged to improve capabilities of physical access control systems. The historical usage data of the user is mined from the historical data that is generated during user/building interaction (as detailed below with respect to FIG. 6). The usage data can be mined to determine context information for use with access control systems. The focus of the profiling in this case is to identify patterns in the user's habits. These patterns can include visited rooms, elevators used, facilities used, and services used.

The method can include an integration platform. The integration platform can be used to acquire the history of building-occupants interactions from heterogeneous building systems. Exemplary heterogeneous building systems include, but are not limited to, access control systems, cameras, occupancy sensors, indoor positioning beacons, agenda information, and structural plans and models of the building. The learned patterns are used to analyze access events (e.g., the use of a card reader or other access-granting device).

Method 200 details an algorithm that can be used to determine potential security threats or other anomalous behavior when analyzing the access events. Method 200 assumes that a profile already exits. A combination of sensors, access granting devices, and the like are used to constantly monitor the location of the users (block 202). As described above, this can include monitoring the mobile electronic device of a user as well as the user's key card or other access granting device. The user's activities can be compared to previously stored activities in a knowledge base (block 204). The user's activities can include the user's habits, including visited rooms, used elevators, and facilities and services exploited and other tracked aspects describe above. If an anomaly is detected, a potential security threat is indicated (block 206). Thereafter, further investigation can be performed on the user's movements and actions (block 208).

If a user's credentials are used on an area that the user typically does not travel to or to which the user does not have access, that can be an indication that a bad actor has the credentials. For example, in an office building situation, if a user only goes to the fifth floor and the eighth floor, those tendencies can be stored in the user's profile within a knowledge base. If the user is accessing the tenth floor, that can be flagged as unusual. This might not be an immediate alarm, for the user may have a very good reason to be on the tenth floor when he typically never goes to the tenth floor. For example, a once yearly meeting can be taking place on the tenth floor. Or the user might be delivering a package he wrongly received.

Similarly, some profiles include access-granting privileges. The user may be allowed to visit certain rooms that are restricted by a key card or mobile electronic device reader. However, the user may not be allowed to visit other rooms that are restricted by a key card or mobile electronic device reader. If the user attempts to visit a room or area to which he is not allowed to visit, an anomaly could be triggered.

However, the user's credentials being used in an atypical manner could be an indication that the user has lost his key card or mobile electronic device. The investigation can take place in one of a variety of different manners. For example, the user's calendar (if the user had previously granted access) can be compared to the user's movements. If the annual meeting on the tenth floor is found in the calendar, than the anomaly is explained and no further investigation needs to take place.

In some instances, if the anomaly cannot be explained, a further watch can be placed on the user's credentials (block 210). In such a manner, each action of the user can be monitored more closely to ensure that the user is not a bad actor.

Figure 5:
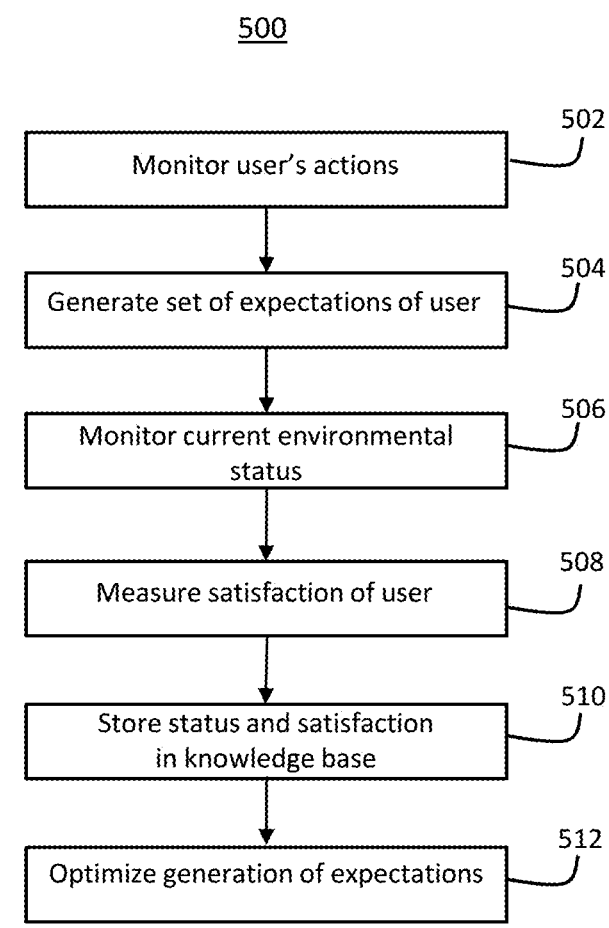
FIG. 5 is a flowchart illustrating the operation of one or more embodiments.

With respect to FIG. 5, a method 500 is presented that illustrates the operation of one or more embodiments. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined, skipped, or performed in a different order. In some embodiments, method 500 can be executed by a system 300.

Method 500 is a method for automatically measuring a user's satisfaction with respect to a smart building. A user can express comfort or discomfort for each aspect being measured. The comfort level of the users can be measured to find and rank discomforting conditions. This can be of use by building management to make repairs or improvements to their building. Method 500 determines the user's satisfaction during a visit and can be configured to determine satisfaction for every visit. Method 500 is used after a user profile has already been established. The user's actions are observed for a certain time period (block 502). The length of the time period can be set to any convenient length of time. In some embodiments, the length of time is approximately one week. Based on the user's profile, a set of the user's expectations are generated using machine-learning techniques (block 504). The current environmental status of the building is obtained (block 506). The environmental status includes lighting comfort as well as thermal comfort. Environmental status can also include data about the building, such as the presence of malfunctions and a current population of the building (how many people are currently occupying the building).

Satisfaction of the user is measured (block 508). This can be done using a human machine interface (HMI). An exemplary HMI is a mobile electronic device. A software application (also known as an "app") can be executed on a mobile electronic device (such as a smartphone, tablet, or smart watch). On the app, the user can note his satisfaction level. In some embodiments, the user can note details of why he is feeling his current satisfaction level.

The satisfaction level, as well as deviations from the user's expectations and the current environmental status are noted and stored in a knowledge base (block 510). Once such data is acquired for multiple users, the data is analyzed and the generation of expectations is optimized (block 512). Analysis can include assigning weights to each of the aspects as well as other tracked information. For example, while crowdedness might not be an aspect, crowdedness could affect thermal comfort. So a weight can be assigned to crowdedness, to predict how crowdedness affects a user's satisfaction level. Each aspect can be ranked using Feature Ranking methodology. In such a manner, using data from each user, one can determine the most informative aspects, such as the aspect that need the most improvement. Exemplary algorithms that can be used include F-Test and Mutual Information algorithms.

Machine learning techniques can be used to optimize a solution of determining the weights to assign for each condition. In some embodiments, a support vector machine can be used as a classifier. Once the system has performed the classification, corrective actions can be used to solve the issues found. In some embodiments, a Learning Modulo Theory (LMT) approach can be used that is an optimization solver to determine the weights.

Once weights are determined, method 500 can be re-iterated to further refine the weights. The weights can be used to determine how the smart building should best react to certain conditions. For example, certain levels of crowdedness may impact users in unforeseen ways, meaning that smart building should respond in a different way to certain environmental conditions than when the building is less crowded.

Cluster analysis can be used to find users with similar feelings. These clusters can be used to find statistically significant discomforting conditions. This can involve a statistical test, such as the Kolmogorov-Smirnov test, to compare clusters and highlight statistically relevant differences.

In such a manner, an automatic system for detecting and weighting discomforting conditions during the user's occupation of a building is disclosed. A smart building can implement correcting actions for improving user experience based on the measure of satisfaction.

Figure 6:
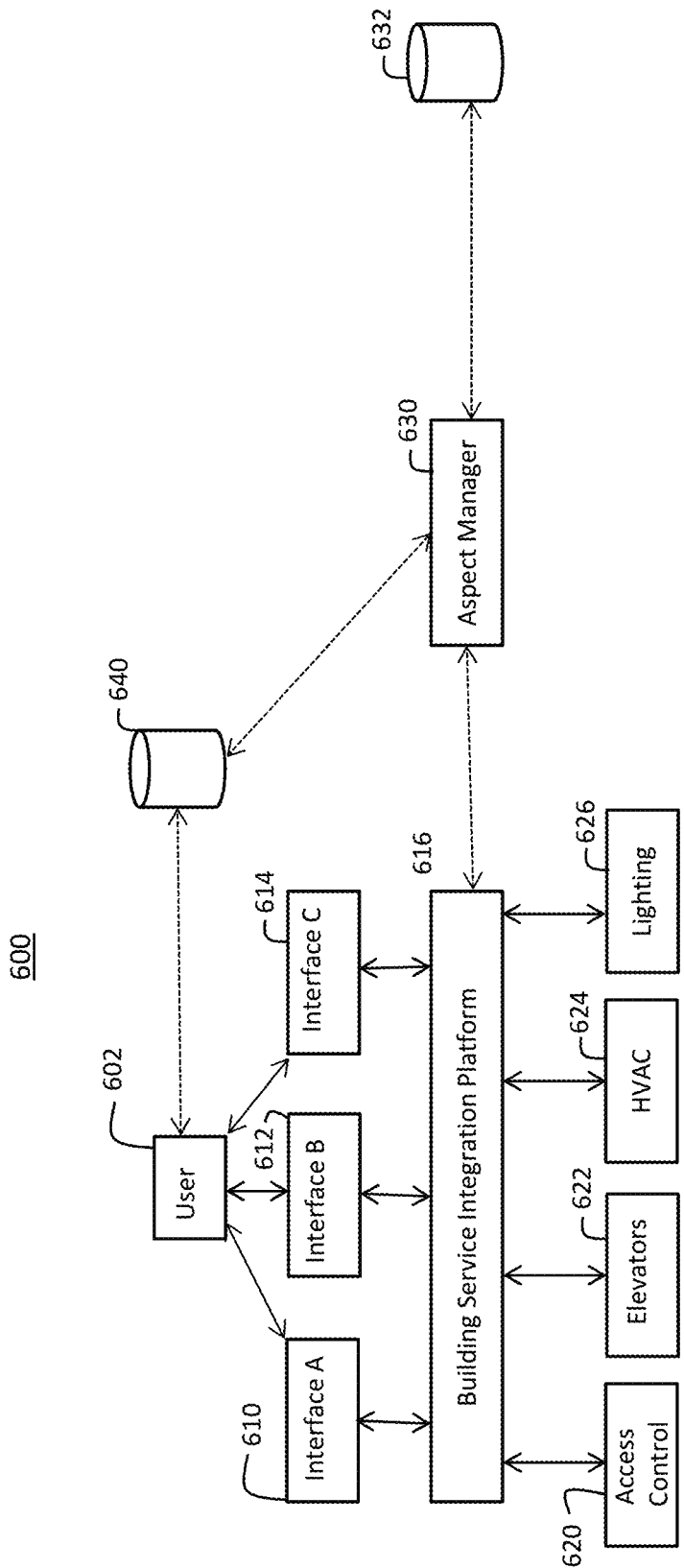
FIG. 6 is a block diagram illustrating the operation of one or more embodiments.

FIG. 6 depicts a block diagram illustrating a system 600 for the purpose of mining and deploying a user profile for a smart building. First, the profiling phase occurs. A user 602 interacts with a smart building through a variety of interfaces 610, 612, and 614. While only three interfaces are shown in FIG. 6, it should be understood that a greater or lesser number of interfaces can be used. Interfaces 610, 612, and 614 represent any manner in which user 602 can interact with the smart building. These can include the user's own mobile electronic device, key cards or other access cards, elevator call buttons, access control devices, light switches, other legacy control systems (e.g., thermostats), and the like. Each of interfaces 610, 612, and 614 can interact with building service integration platform 616. Building service integration platform 616 serves as a link between each of the interfaces 610, 612, and 614 and the actual services provided by the smart building. The services can include access control 620 (such as door locks and other entrance control devices), elevators 622, HVAC 624, and lighting 626. It should be understood that lighting 626 can include, not only controls for light fixtures, but also include controls for window coverings (such as shades, blinds, and the like). Each interaction that user 602 has with the smart building, through building service integration platform 616, is processed by aspect manager 630. Aspect manager 630 can receive additional information (such as context information) from knowledge base 640. As more and more data is gathered for each user, the information processed by aspect manager 630 is stored in a distributed profile repository 632.

Aspect manager 630 can collect the event information and mine data by each aspect. Thereafter, an ideal machine-learning algorithm can be determined to use for the processing of the data. This can occur using an iterative process, in which a new machine-learning algorithm is used for each iteration to determine which algorithm results in the best model. Thereafter, the selected aspect model is stored in the profile repository 632.

Figure 7:
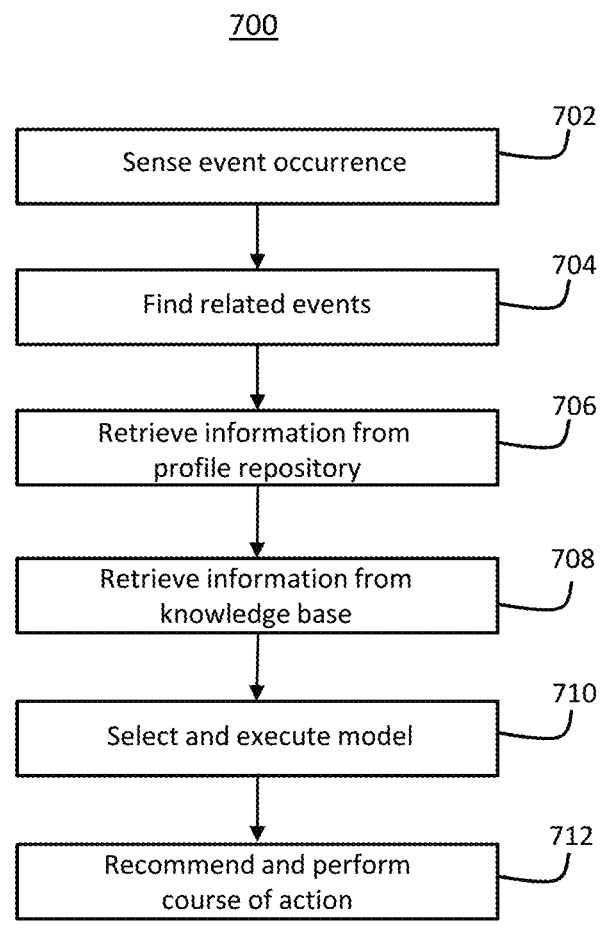
FIG. 7 is a flowchart illustrating the operation of one or more embodiments.

A second phase that can occur is the "adaptive enactment" phase. This phase applies the profile to the various aspects. This phase uses system 600 the will be discussed in conjunction with the flowchart 700 of FIG. 7.

An event occurrence is sensed (block 702). This occurrence can be an input of the user 602 through the use of one of the interfaces 610, 612, or 614. Or it can be a sensor acting as one of the interfaces that detects user 602. The event is filtered to determine if there are any related events (block 704). There can be instances where multiple interfaces detect the same event or related events. For example, traveling to a certain floor to enter a certain room can be considered related events. Information is then retrieved from profile repository 632 (block 706) to determine which model to use based on the aspect and the user and from knowledge base 640 (block 708) to gather contextual information.

Aspect manager 630 then selects and executes the selected model (block 710) to recommend a course of action (block 712). The recommended course of action is then executed by building services integration platform 616. For example, the course of action may be to change the lighting, call an elevator, change HVAC settings, or the like.

Another feature of the above-described system is the ability to share the profile across multiple sites. The user profile described above can be portable across different sites. This can include, not only buildings owned or operated by the same entity (such as a college or office campus or a chain of hotels), but also buildings owned or operated by different entities. In other words, a hotel chain can share profile information with an office building or with a shopping mall or an apartment building that is owned or operated by a different entity.

As discussed above, a user profile is created through the fusion and reconciliation of data from one or more building system interfaces (for example, interfaces 610, 612, and 614). The profile for each user is stored in distributed profile repository 632. Each system and associated building is described in knowledge base 640 according to shared conceptual structures. Each profile in profile repository 632 is regularly updated according to the user's interactions with the systems that are operating in each visited building, and linked to the shared descriptions (such as the context information) stored in knowledge base 640. In such a manner, each user's profile can be seamlessly applicable across a multitude of environments.

Thereafter, when a user enters an unvisited environment, the user's profile can be retrieved. The profile can include credentials, the user's activity history log, user-related attributes, a collection of action/resource request templates, and the like. The unvisited environment can be compared to environment and context of environments that the user had previously visited. Thereafter, the environment of the unvisited location can be adjusted to an estimated comfort level based the user's profile and the context of the places he had visited previously. For example, if the user had previously visited a hotel as a guest, different hotels could use that information to determine a proper environment for the user's stay as a guest at a previously unvisited hotel. Information regarding the user's preferences as an employee can be given less weight, because those locations do not share the same context. The user's profile can be treated as a "digital signature" that can enable advanced interfaces and offer a holistic, cohesive, and personalized experience across different buildings and systems therein.

In addition, access control policies can be issued by different authorities. Access control policies serve to express, in a declarative fashion, the granting or forbidding of access. Access control policies also can include user-dependent context information as well as user-independent context information.

The profile can include user authorization information that details access control rules that are portable among multiple buildings. The user-dependent context information (e.g., whether the user is an employee or a guest), can be used to determine the access the user has regarding a system. In addition, the user-independent context information (e.g., the size and shape of the building, the purpose of the various rooms, and the like) can be used to determine thermal comfort and lighting comfort.

There can be alternative applicable access control rules identified through available context information. For example, a user might be always allowed to access lighting and HVAC parameters of a guest room at a hotel where the user is a registered guest.

In some embodiments, it can be desirable to detect the intent of users for a variety of advanced building applications. Exemplary applications can include egress, occupancy-based building control, and destination management systems. It can be desirable to model a group's behavior to learn the user's intents while preserving the privacy of the users and detecting abnormal behavior.

Figure 8:
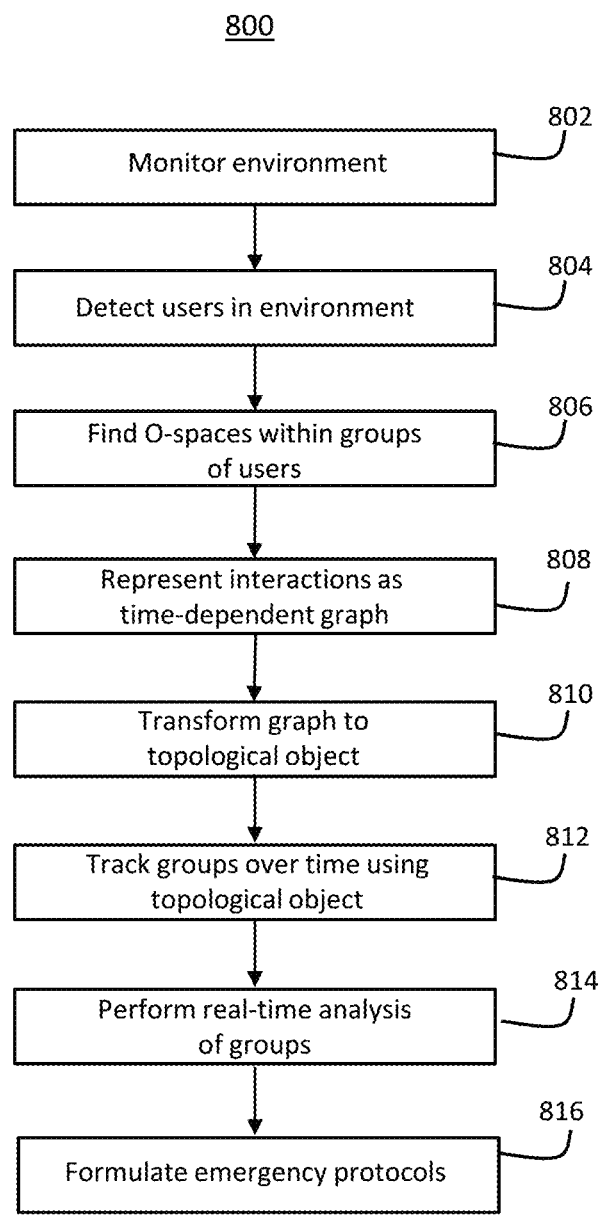
FIG. 8 is a flowchart illustrating the operation of one or more embodiments.

A flowchart 800 illustrating such a use case is shown in FIG. 8. An environment is monitored using one or more sensors (block 802). The environment being monitored can be a room inside a building or a common area adjacent to a building, or the like. The environment can include several rooms. The sensors being used can be any one or combination of sensors. Exemplary sensors can include cameras, presence detection sensors, wireless transceivers, and the like.

People are detected within the environment being monitored (block 804). Groups of people can be sensed in one of a variety of different manners. A group can be broadly understood as a social unit that includes several members who stand in status and relationships with one another. A type of group being analyzed can include free-standing conversational groups (FCGs). An FCG is an ensemble of co-present person engaged in ad-hoc encounters. These can be considered focused encounters. Exemplary FCGs can include a party, a decoration session, or an office meeting.

Figure 9:
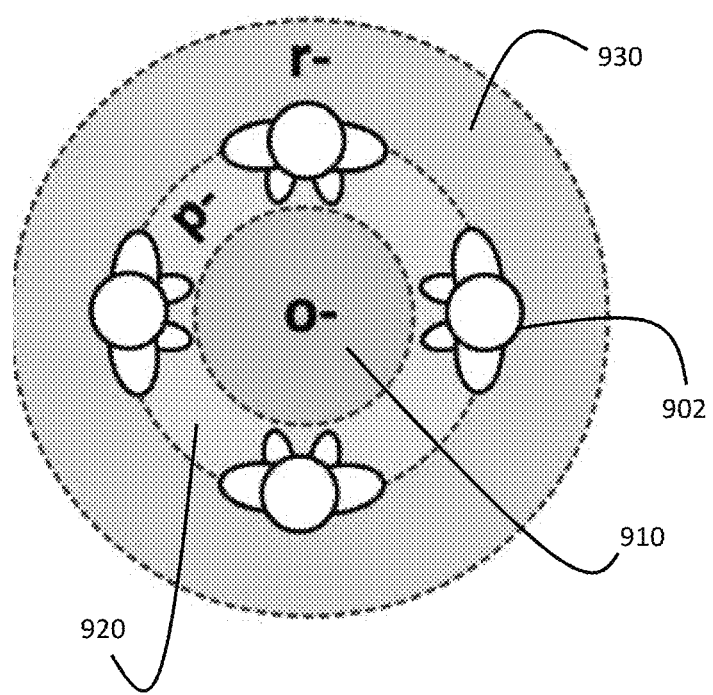
FIG. 9 is a diagram of a group formation.

FCGs can be detected by computing the facing formation (also known as an F-formation) from the spatial position and orientation of the occupants. An F-formation is a proper organization of three social spaces (illustrated in FIG. 9). An O-space 910 is a convex empty space surrounded by the people (902) involved in a social interaction, where every participant is oriented inward toward the O-space 910. No external people are present in O-space 910. P-space 920 is a ring surrounding O-space 910. The people within the FCG are located within P-space 920. R-space 930 is the space surrounding the P-space 920 and is also monitored by the FCG participants.

Referring back to FIG. 8, the orientation and location of the users is used to determine the presence of one or more FCGs within a group of users. Each user's orientation and location is tracked to find O-spaces (block 806).

Groups can change over time. Two groups of four people can become a group of five people and a group of three people, a single group eight people, or any of a variety of different sized groups. Additional people can join or leave a group upon entering or leaving an area being monitored. Groups can spread into subgroups, can merge, can disappear, and the like. Both graph and topological methods can be used to determine these behaviors. Exemplary methods of computing entropy include the use of Von Neumann Entropy equations to measure groupness over time and the use of Persistent Entropy to detect group fusion in circular motifs.

Each of the interactions within and between groups can be represented as a time-dependent network (block 808). This can be accomplished using undirected graphs. A graph is a mathematical structure used to model pairwise relations between objects. A graph is an ordered pair $G=(V, E)$ comprising a set V of vertices (or nodes or points) together with a set of E edges associated with two vertices. Using Von Neumann entropy equations, one can find entropy as it relates to a graph. Using persistent homology techniques, one can cluster shapes and discover higher dimensional correlations that otherwise cannot be pinpointed out with classical statistical methods. Thus, a graph can be transformed into a topological object (block 810). Using a persistent homology algorithm, the connectivity between the vertices can be determined, thus tracking the group over time (block 812) by detecting temporary and persistent groups in circular motifs. Once the model has been deployed, it can be used for real-time analysis (block 814). In such a manner abnormal behavior (including, but not limited to those discussed with respect to FIG. 2), can be detected for groups as well as individuals. In other words, the intentions of individual groups and intentions between groups can be mined. The mined information can be used to find abnormal behavior within a group. In addition, the mined information can be used to formulate emergency response plans, such as ideal escape routes and potential problems on existing routes (block 816).

Figure 3:
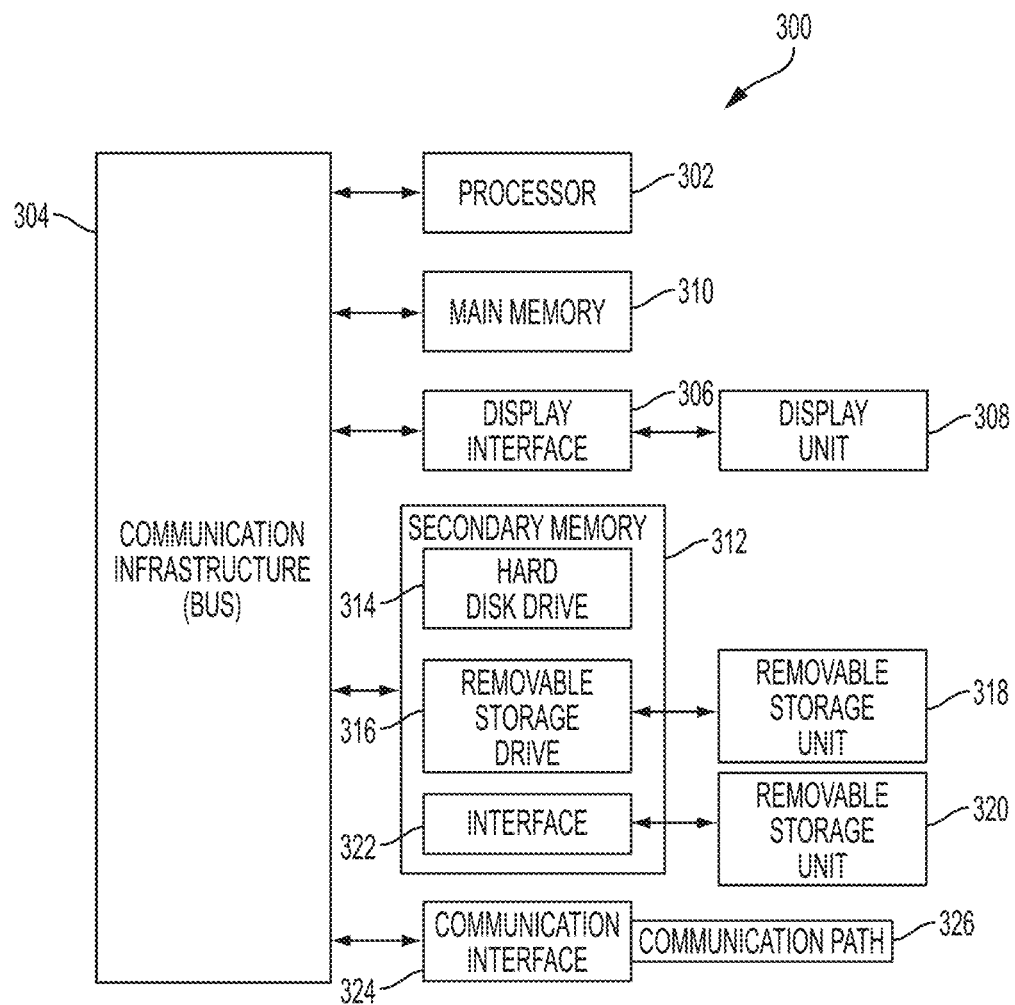
FIG. 3 is a block diagram of a computer system capable of performing one or more embodiments.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
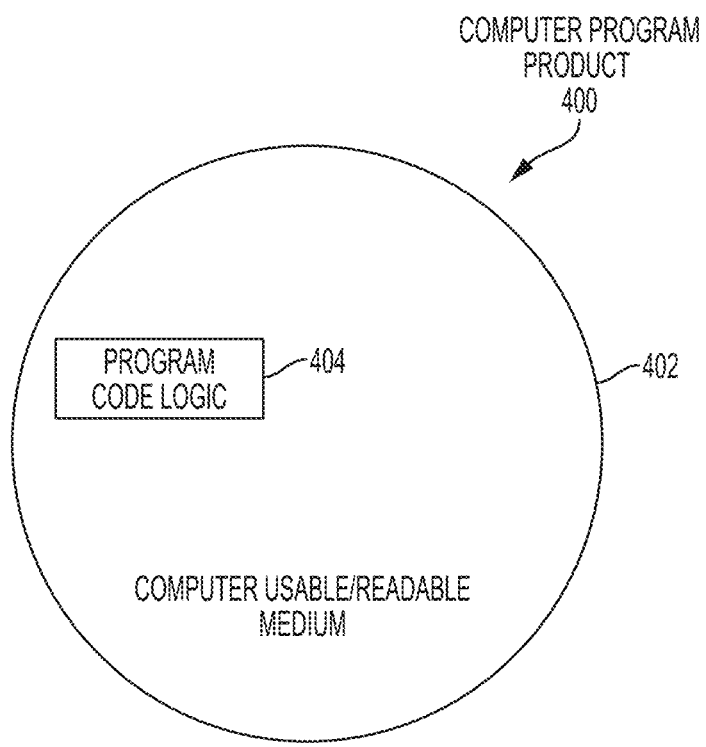
FIG. 4 is a block diagram of an exemplary computer program product.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for measuring satisfaction for a smart building comprising:
    detecting a presence of a user at the smart building;
    monitoring actions of the user in the smart building with respect to each of a plurality of aspects using one or more sensors to detect movement of the user through the smart building;
    receiving feedback via a human machine interface from the user regarding one or more of the plurality of aspects, including determining a satisfaction level of the user with respect to comfort; and
    building a profile for the user based on the monitored actions and the received feedback;
    adjusting the one or more of the plurality of aspects based on the profile;
    assigning a weight to each of the plurality of aspects;
    ranking the plurality of aspects;
    determining which aspect of the plurality of aspects is causing a discomforting condition based on the weights; and
    adjusting parameters of the smart building based on the aspect causing the discomforting condition.

2. The computer-implemented method of claim 1, wherein:
    the human machine interface is an app executed on a mobile electronic device.

3. The computer-implemented method of claim 1, wherein:
    the plurality of aspects includes thermal comfort, lighting comfort, services interaction, and health status.

4. The computer-implemented method of claim 3, wherein:
    lighting comfort includes quantity of light and color temperature of light.

5. The computer-implemented method of claim 1, wherein:
    the plurality of aspects includes services interactions.

6. The computer-implemented method of claim 1, further comprising:
    observing deviation in comfort of the user.

7. The computer-implemented method of claim 1, wherein:
    detecting the presence of the user comprises sensing a mobile electronic device carried by the user.

8. The computer-implemented method of claim 1, wherein:
    detecting the presence of the user comprises sensing usage of an access control device by the user.

9. A computer system for measuring satisfaction for a smart building comprising:
    a processor;
    a memory;
    computer program instructions configured to cause the processor to perform the following method:
    detecting a presence of a user at the smart building;
    monitoring actions of the user in the smart building with respect to each of a plurality of aspects using one or more sensors to detect movement of the user through the smart building;

receiving feedback via a human machine interface from the user regarding one or more of the plurality of aspects, including determining a satisfaction level of the user with respect to comfort; and building a profile for the user based on the monitored actions and the received feedback;

adjusting the one or more of the plurality of aspects based on the profile;

assigning weights to each of the plurality of aspects;

ranking the plurality of aspects;

determining which aspect of the plurality of aspects is causing a discomforting condition based on the weights; and adjusting parameters of the smart building based on the aspect causing the discomforting condition.

10. The computer system of claim 9, wherein:

the human machine interface is an app executed on a mobile electronic device.

11. The computer system of claim 9, wherein:

the plurality of aspects includes thermal comfort, lighting comfort, services interaction, and health status.

12. The computer system of claim 11, wherein:

lighting comfort includes quantity of light and color temperature of light.

13. The computer system of claim 9, wherein:

the plurality of aspects includes services interactions detailing patterns of movement of the user.

14. The computer system of claim 9, wherein the method further comprises:

observing deviation in comfort of the user.

* * * * *